6214X
S. FELTON.
Plow.
Patented Nov. 1, 1830.
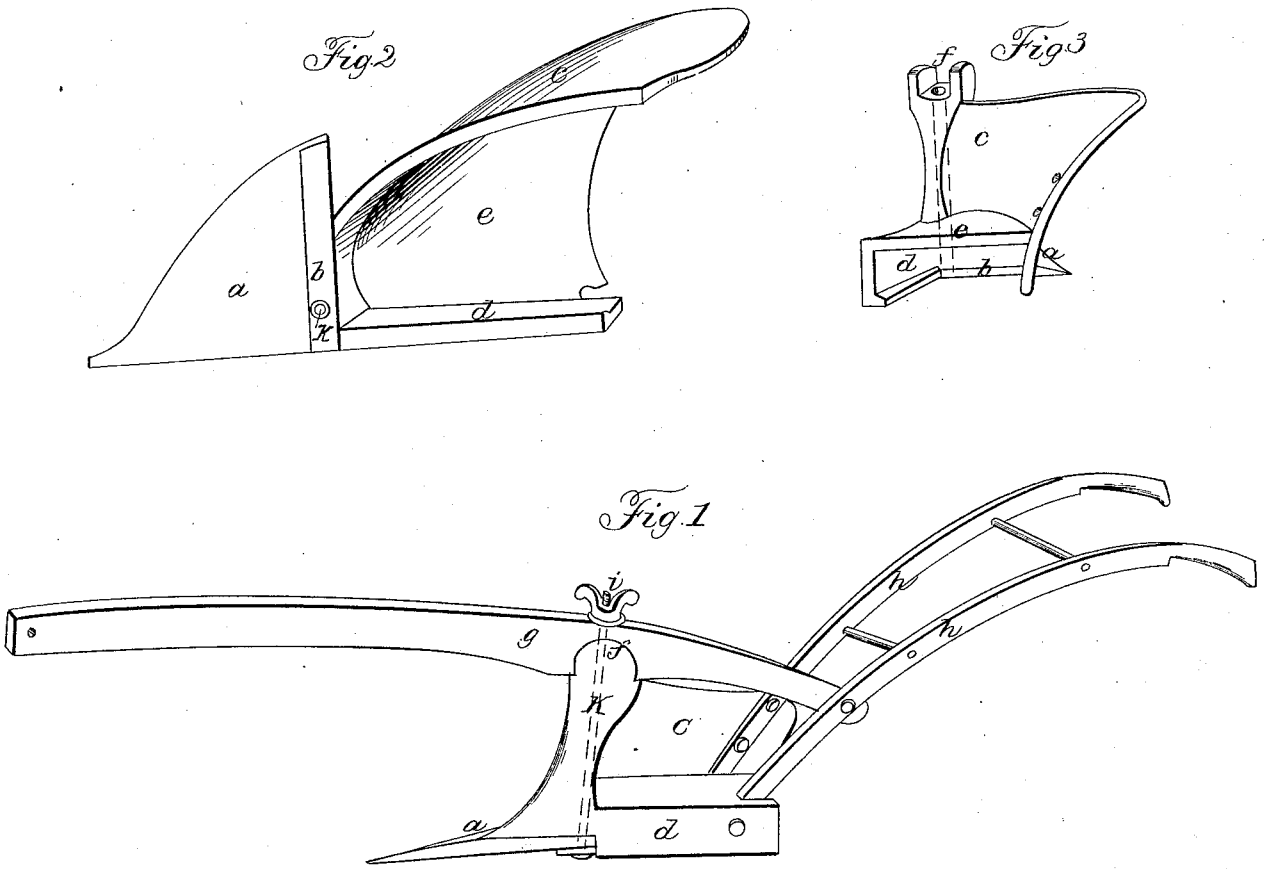
N. PETERS, PHOTO-LITHOGRAPHER, WASHINGTON, D. C.

6214X

UNITED STATES PATENT OFFICE.

SAMSON FELTON, OF HUNTINGDON, PENNSYLVANIA.

IMPROVEMENT IN PLOWS.

Specification forming part of Letters Patent dated November 1, 1830.

*To all whom it may concern:*

Be it known that I, SAMUEL FELTON, of Huntingdon, in the county of Huntingdon and State of Pennsylvania, have made an Improvement in Plows, which is described as follows:

This plow consists of the following principal parts—viz, first, the share; second, the mold-board; third, the landside; fourth, the beam and handles.

First. The share is made of wrought or cast iron. When made of wrought-iron a bar of iron faced with steel is worked to any pattern, having a cross-bar behind, which connects the lower part of the share and landside together. The share is pointed with steel.

Second. The upper part of the mold-board is made of cast-iron, and with the upper part of the landside are cast together, and have a plate or floor connecting them together at some distance from the edge of the share, and which is cast, together with the landside and mold-board, near the lower side. On the top of the mold-board is a seat or saddle for the beam to rest on.

Third. The landside, as before described, is made partly of the wrought-iron share and the cast-iron mold-board. The plate or floor is placed in the space between the mold-board and landside at the lower side, and serves to strengthen and connect them together.

Fourth. The beam and handles are made of wood, and in the usual form.

The invention here claimed is the manner of making the share and mold-board, as before described, the plate or floor which connects them together, the cross bar, the saddle or seat on which the beam rests, also the bolt passing through the beam and connected with the cross-bar of the share, and landside having a thumb-screw on the top for regulating it.

Further to illustrate my invention I refer to the model and drawing of the same deposited in the Patent Office.

In testimony that the foregoing is a true specification of my invention I have hereunto signed my name, before two witnesses, and made oath to the same, at the city of Washington, this 9th day of October, 1830.

SAMSON FELTON.

Witnesses:

WILLIAM P. ELLIOT,

HENRY WEST.